United States Patent
Kock

[15] 3,673,292
[45] June 27, 1972

[54] PROCESS FOR THE PREPARATION OF GAS PERMEABLE HYDROPHOBIC FOILS FOR ELECTROCHEMICAL CELLS

[72] Inventor: Klaus Kock, Tubingen-Lustnau, Germany
[73] Assignee: Robert Bosch GmbH, Stuttgart, Germany
[22] Filed: June 11, 1969
[21] Appl. No.: 832,501

[30] Foreign Application Priority Data
June 12, 1968 Germany .................... P 17 69 595.3

[52] U.S. Cl. .................... 264/49, 136/148, 264/127, 264/234, 264/338, 264/DIG. 62, 264/DIG. 65, 264/DIG. 72
[51] Int. Cl. .................... B29d 27/08, C08f 3/22, H01m 3/02
[58] Field of Search ........ 264/41, 49, 127, DIG. 62, DIG. 65, 264/DIG. 72; 136/146, 148; 117/132 CF

[56] References Cited

UNITED STATES PATENTS

| | | | |
|---|---|---|---|
| 2,400,091 | 5/1946 | Alfthan | 264/127 X |
| 2,540,962 | 2/1951 | Puppolo | 264/127 |
| 2,662,065 | 12/1953 | Berry | 264/127 X |
| 2,997,448 | 8/1961 | Hochberg | 264/49 X |
| 3,202,733 | 8/1965 | Strauss | 264/127 X |
| 3,203,829 | 8/1965 | Seyer et al. | 117/132 CF |
| 3,279,936 | 10/1966 | Forestek | 117/132 CF X |
| 3,281,511 | 10/1966 | Goldsmith | 264/127 X |
| 3,340,216 | 9/1967 | Mack | 117/132 CF X |
| 3,497,256 | 2/1970 | Rosenblatt | 264/127 X |
| 3,518,332 | 6/1970 | Sklarchuk et al. | 264/127 X |
| 2,852,811 | 9/1958 | Petriello | 264/127 X |

OTHER PUBLICATIONS

Brandrup, J., Ed. "Polymer Handbook" New York, Interscience, 1966, page IV-188.

Primary Examiner—Philip E. Anderson
Attorney—Michael S. Striker

[57] ABSTRACT

Gas permeable hydrophobic foils useful for electrochemical cells prepared by covering a temperature resistant hot plate or mold with a temperature resistant release layer, spraying a suspension or solution of a fluorine containing polymer onto said release layer and sintering the polymer.

8 Claims, 3 Drawing Figures

FIG. 1
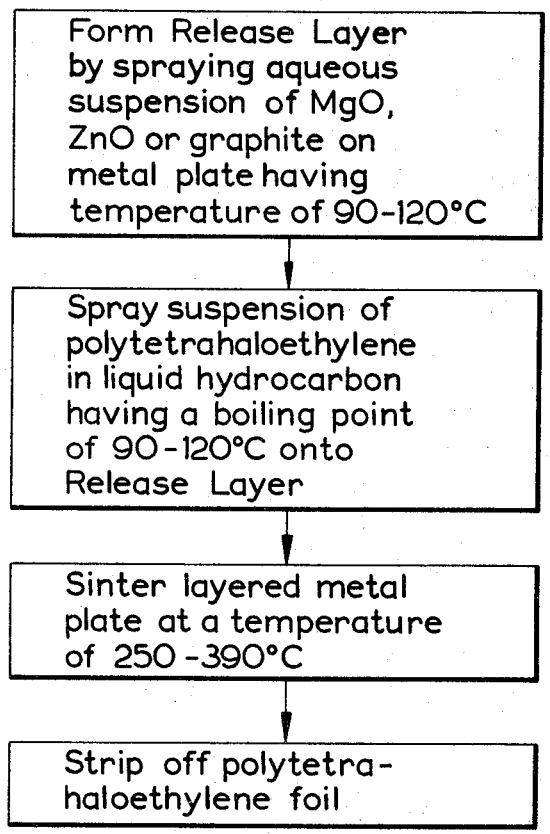
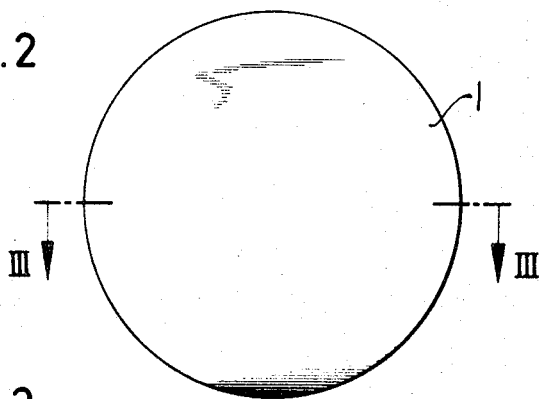
FIG. 2
FIG. 3
INVENTOR
Klaus KOCK
By
their ATTORNEY

PROCESS FOR THE PREPARATION OF GAS PERMEABLE HYDROPHOBIC FOILS FOR ELECTROCHEMICAL CELLS

This invention relates to a process for the preparation of porous, gas permeable hydrophobic foils of fluorine containing polymers, such as polytetrafluoroethylene, suitable for use in electrochemical cells, for example fuel cells.

It is known to produce porous foils having low thicknesses from polytetrafluoroethylene, by preparing a paste from polytetrafluoroethylene, pore forming agents and suitable liquids, rolling the paste to form foils and then sintering the foils.

According to the invention, a novel and improved process for the manufacture of porous gas permeable hydrophobic foils from fluorine containing polymers has now been found which comprises covering a hot, temperature resistant plate or mold with a temperature resistant release layer, spraying onto said release layer a suspension or solution of a fluorine containing polymer and sintering the polymer. Preferably as fluorine containing polymer, polytetrafluoroethylene is used. Generally the release layer is heat resistant at temperatures up to 400° C. The temperature of the hot plate or mold should generally be in the range of the boiling point of the solvents or suspension medium used.

Any suitable release layer can be used in the process of the invention, for example those formed by spraying aqueous suspensions of zinc oxide, magnesium oxide or graphite onto the plate or mold which has been preheated to a temperature of from about 90° to about 120° C.

As fluorine containing polymer, in accordance with the invention there can be used any such polymer, for instance polytrifluoromonochloroethylene and polytetrafluoroethylene, the latter being preferred. The fluorine containing polymer is applied in the form of its solution or suspension in for example a liquid hydrocarbon, such as ligroin, gasoline and the like.

In accordance with a preferred embodiment of the invention, pore forming agents are added to the fluorine containing polymer. An instance of a suitable pore forming agent is zinc oxide.

The foils produced in accordance with the invention are characterized by high gas permeabilities, excellent mechanical strengths and hydrophobic properties at thickness above $150\mu$.

In order to obtain foils having different surface structures and in order to improve the mechanical strength of foils having lesser thicknesses, the sprayed foil can be subjected to rolling or other smoothing operation before, during or after removal of the solvent or suspension agent. The solutions or suspensions of the fluorine containing polymer may contain additives, such as for example paraffin which facilitates the rolling of the foils or agents which aid in pore formation. The mechanical properties of the foils have proved to be excellent at weights of more than 1g per cm² foil surface.

BRIEF DESCRIPTION OF THE DRAWING

FIG. 1 is a flow sheet illustrating the several steps of the process of the invention;

FIG. 2 of the drawing shows at 1 a gas permeable hydrophobic foil as formed on a plate of circular circumference on top of an intermediate release layer (not shown); and FIG. 3 shows a cross-section at right angles along line I—I of FIG. 1 wherein 2 indicates the carrier plate, 3 the release layer and 1 the gas permeable hydrophobic polytetrafluoroethylene foil.

The following examples are given to illustrate the invention and are not to be considered as limiting the same.

EXAMPLE 1

A suspension of 3 parts of zinc oxide in 50 parts of water was sprayed onto a metal plate having a temperature of from 90° to 120° C. Onto the release layer thereby obtained which substantially consisted of zinc oxide, a mixture of 50 parts of polytetrafluoroethylene known by the trade name HOSTAFLON VP 17 and 200 parts of gasoline was sprayed at a plate temperature of about 80° C. Thereafter sintering was carried out at 350°–390° C. The foil formed on the release layer had at a thickness of over $150\mu$ good mechanical strength, excellent air permeability and hydrophobic properties.

EXAMPLE 2

A suspension of 5 parts of MgO and 50 parts of water was sprayed onto a metal plate having a temperature of about 100° C. A release layer consisting essentially of MgO was formed by evaporation of the water. A suspension consisting of 50 parts of polytetrafluoroethylene (HOSTAFLON VP 17) and 200 parts of ligroin was sprayed onto the MgO layer, rolled using suitable rollers, smoothed and sintered at 350°–390° C. The foils thereby obtained had exceptional mechanical properties at thicknesses above $80\mu$.

EXAMPLE 3

A suspension of graphite in water was sprayed onto a metal plate having a temperature of about 100° C. After evaporation of the water, a release layer consisting essentially of graphite was obtained. A suspension of 50 parts of polytetrafluoroethylene (HOSTAFLON VP 17) 200 parts ligroin and 10 parts of zinc oxide as pore forming agent was sprayed onto the graphite release layer and rolling then carried out. After sintering the pore forming agent was extracted with hydrochloric acid.

EXAMPLE 4

Onto a release layer formed by spraying an emulsion of MgO in water onto a heated metal plate, a mixture of 50 parts of polytetrafluoroethylene (HOSTAFLON VP 17), 200 parts of ligroin and 5 to 10 parts of paraffin, was applied by spraying. Thereafter rolling, followed by sintering at 350° to 390° C. were carried out. The addition of paraffin substantially improved the rollability of the sprayed layer.

EXAMPLE 5

50 parts of polytrifluoromonochloroethylene (trade name VOLTALEF 300 VF) were mixed with 50 parts of paraffin and 200 parts of ligroin. The resulting suspension was sprayed onto a release layer prepared from zinc oxide and water which had been heated to 80° C., and thereafter sintered at 250°–290° C.

What is claimed as new and desired to be protected by Letters Patent is set forth in the appended

1. A process of preparing a porous, gas permeable hydrophobic polytetrahaloethylene foil for use in electrochemical cells, which comprises the steps of depositing onto a preheated plate or mold made of a heat resistant material and having a temperature of from 90°–120° C., a release layer which is heat resistant at temperatures at least up to 400° C. by spraying an aqueous suspension of a member selected from the group consisting of zinc oxide, magnesium oxide and graphite, spraying onto said hot release layer a suspension of polytetrahaloethylene in a liquid hydrocarbon having a boiling point in the range of the temperature of said preheated plate or mold, thereafter sintering said layers on said plate or mold and stripping the foil formed on said release layer.

2. Process according to claim 1, wherein said polytetrahaloethylene is polytetrafluoroethylene.

3. Process according to claim 1 wherein said polytetrahaloethylene is polytrifluoromonochloroethylene.

4. Process according to claim 1, wherein said liquid hydrocarbon is ligroin.

5. Process according to claim 1, wherein said liquid hydrocarbon is gasoline.

6. Process according to claim 1, wherein said suspension of polytetrahaloethylene additionally contains a leachable pore forming agent.

7. Process according to claim 6, wherein said pore forming agent is zinc oxide.

8. Process according to claim 6, wherein said pore forming is removed following said sintering by extraction with hydrochloric acid.

* * * * *